US010973718B2

(12) United States Patent
Paul et al.

(10) Patent No.: US 10,973,718 B2
(45) Date of Patent: Apr. 13, 2021

(54) POWER MANAGEMENT TECHNIQUES FOR ACTUATORS OF PATIENT SUPPORT APPARATUSES

(71) Applicant: Stryker Corporation, Kalamazoo, MI (US)

(72) Inventors: Anish Paul, Kalamazoo, MI (US); Krishna S. Bhimavarapu, Kalamazoo, MI (US)

(73) Assignee: Stryker Corporation, Kalamazoo, MI (US)

( * ) Notice: Subject to any disclaimer, the term of this patent is extended or adjusted under 35 U.S.C. 154(b) by 177 days.

(21) Appl. No.: 16/041,014

(22) Filed: Jul. 20, 2018

(65) Prior Publication Data

US 2019/0021922 A1    Jan. 24, 2019

Related U.S. Application Data

(60) Provisional application No. 62/535,278, filed on Jul. 21, 2017.

(51) Int. Cl.
*A61G 7/018*  (2006.01)
*H02P 29/024*  (2016.01)
*A61G 7/10*  (2006.01)

(52) U.S. Cl.
CPC .......... *A61G 7/018* (2013.01); *A61G 7/1065* (2013.01); *H02P 29/027* (2013.01);
(Continued)

(58) Field of Classification Search
CPC .. A61G 7/018; A61G 7/1065; A61G 2203/30; A61G 2203/32; A61G 2203/34;
(Continued)

(56) References Cited

U.S. PATENT DOCUMENTS 2,258,958 A  * 10/1941  Pearson  .................. H01B 1/00
                                                          338/25
7,398,571 B2    7/2008  Souke et al.
(Continued)

OTHER PUBLICATIONS

Littelfuse, "PolySwitch PTC Devies Overcurrent Protection Device Specifications", Jul. 26, 2016, 2 pages.

*Primary Examiner* — David R Hare
(74) *Attorney, Agent, or Firm* — Howard & Howard Attorneys PLLC

(57) ABSTRACT

Systems, methods and techniques for operating a patient support apparatus are disclosed. The patient support apparatus includes a support structure including a base and a patient support surface to support a patient. The patient support apparatus also includes an actuator coupled to the support structure and operable to move the patient support surface. The actuator is configured to receive an applied voltage and an applied electrical current, and to produce an output power, where the applied electrical current varies based on different loads applied to the actuator. A controller is coupled to the actuator to determine a desired output power of the actuator and to control the actuator such that the output power produced by the actuator is controlled relative to the desired output power by modifying the applied voltage to compensate for the different loads being applied to the actuator.

18 Claims, 10 Drawing Sheets

(52) U.S. Cl.
CPC ...... *A61G 2203/30* (2013.01); *A61G 2203/32* (2013.01); *A61G 2203/34* (2013.01); *A61G 2203/36* (2013.01); *A61G 2203/44* (2013.01)

(58) Field of Classification Search
CPC ............ A61G 2203/36; A61G 2203/44; H02P 29/027
See application file for complete search history.

(56) References Cited

U.S. PATENT DOCUMENTS

| | | | |
|---|---|---|---|
| 8,439,416 | B2 | 5/2013 | Lambarth et al. |
| 9,138,173 | B2 | 9/2015 | Penninger et al. |
| 2007/0157385 | A1* | 7/2007 | Lemire ................. A61G 7/0509 5/600 |
| 2007/0174965 | A1* | 8/2007 | Lemire ................. A61G 7/0509 5/600 |
| 2009/0165208 | A1* | 7/2009 | Reed .................... A61G 1/0243 5/611 |
| 2013/0205501 | A1* | 8/2013 | Robertson ............. A61G 7/018 5/611 |
| 2013/0282234 | A1* | 10/2013 | Roberts .................. A61G 7/08 701/36 |
| 2014/0115778 | A1* | 5/2014 | Ng ....................... A61G 7/1059 5/83.1 |
| 2016/0022039 | A1 | 1/2016 | Paul et al. |
| 2017/0172819 | A1* | 6/2017 | Bourgraf ................ A61G 1/013 |
| 2017/0172827 | A1* | 6/2017 | Schaaf .................. A61G 7/018 |
| 2017/0340495 | A1 | 11/2017 | Paul |

\* cited by examiner

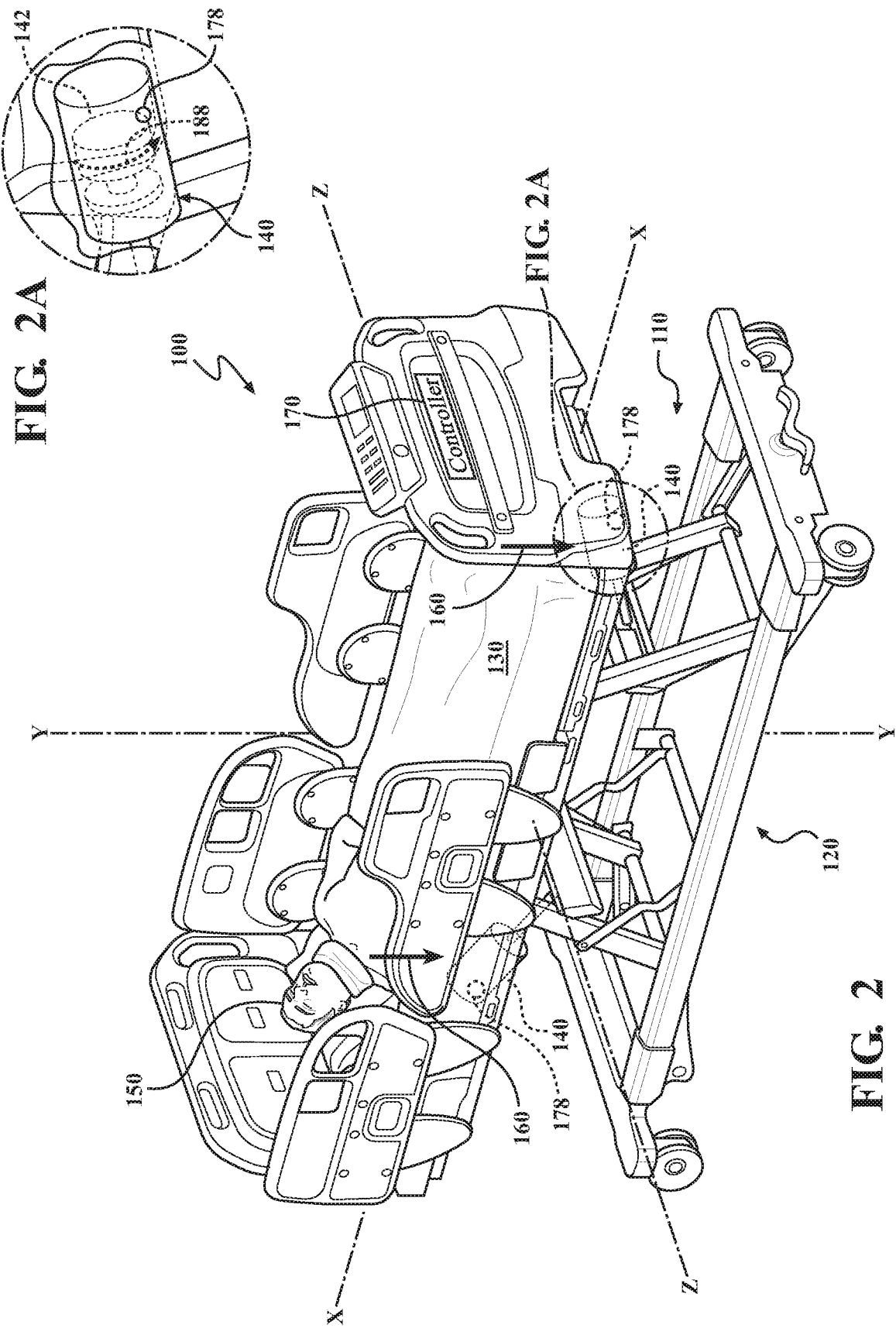

US 10,973,718 B2

POWER MANAGEMENT TECHNIQUES FOR ACTUATORS OF PATIENT SUPPORT APPARATUSES

RELATED APPLICATION

The present application claims the benefit of U.S. Provisional Patent Application No. 62/535,278, filed on Jul. 21, 2017, the entire disclosure of which is hereby incorporated by reference.

BACKGROUND

Actuators are commonly used on a patient support apparatus for various purposes. For example, the patient support apparatus may be equipped with a lift assembly that uses actuators to lift a patient resting on a patient support surface to a desired height. Another example of is an actuator used to manipulate angular positioning of portions of the patient support surface, such as the fowler, etc.

Control of such actuators according to conventional techniques falls short in many ways. For example, the actuator is typically preconfigured and controlled to provide the same output regardless of the load applied to the actuator. For instance, the actuator responds with the same speed of movement regardless of weight of the patient.

Moreover, actuators typically draw in more electrical current with increases in torque applied to the actuator, and consequently with increases in load applied to the actuator. Accordingly, conventional control systems for actuators do not take into account such increases in drawn electrical current when patients of greater weight are on the patient support apparatus. Patient support apparatuses often receive power from the AC electrical outlets of a healthcare facility when they are docked. Consequently, when one or more actuators are under heavy load, there is a possibility to overload the electrical system of the facility based on overload in drawn electrical current. Such overload may result in triggering circuit protection means (e.g., circuit breakers) for the facility electrical system. In turn, critical power to the patient support apparatus may be interrupted. Furthermore, resetting such circuit protection means is inconvenient and time consuming. As such, there are opportunities to address at least the aforementioned problems.

BRIEF DESCRIPTION OF THE DRAWINGS

Advantages of the present disclosure will be readily appreciated as the same becomes better understood by reference to the following detailed description when considered in connection with the accompanying drawings wherein:

FIG. 2 is a perspective view, partially in phantom, of the patient support apparatus comprising actuators shown undergoing an applied load.

FIG. 2A is a magnified view, partially in phantom, of the actuator of the patient support apparatus.

DETAILED DESCRIPTION

Referring to the Figures, wherein like numerals indicate like or corresponding parts throughout the several views, power management techniques for one or more actuators 140 of a patient support apparatus 100 are provided.

I. Patient Support Apparatus Overview

Figure 1:
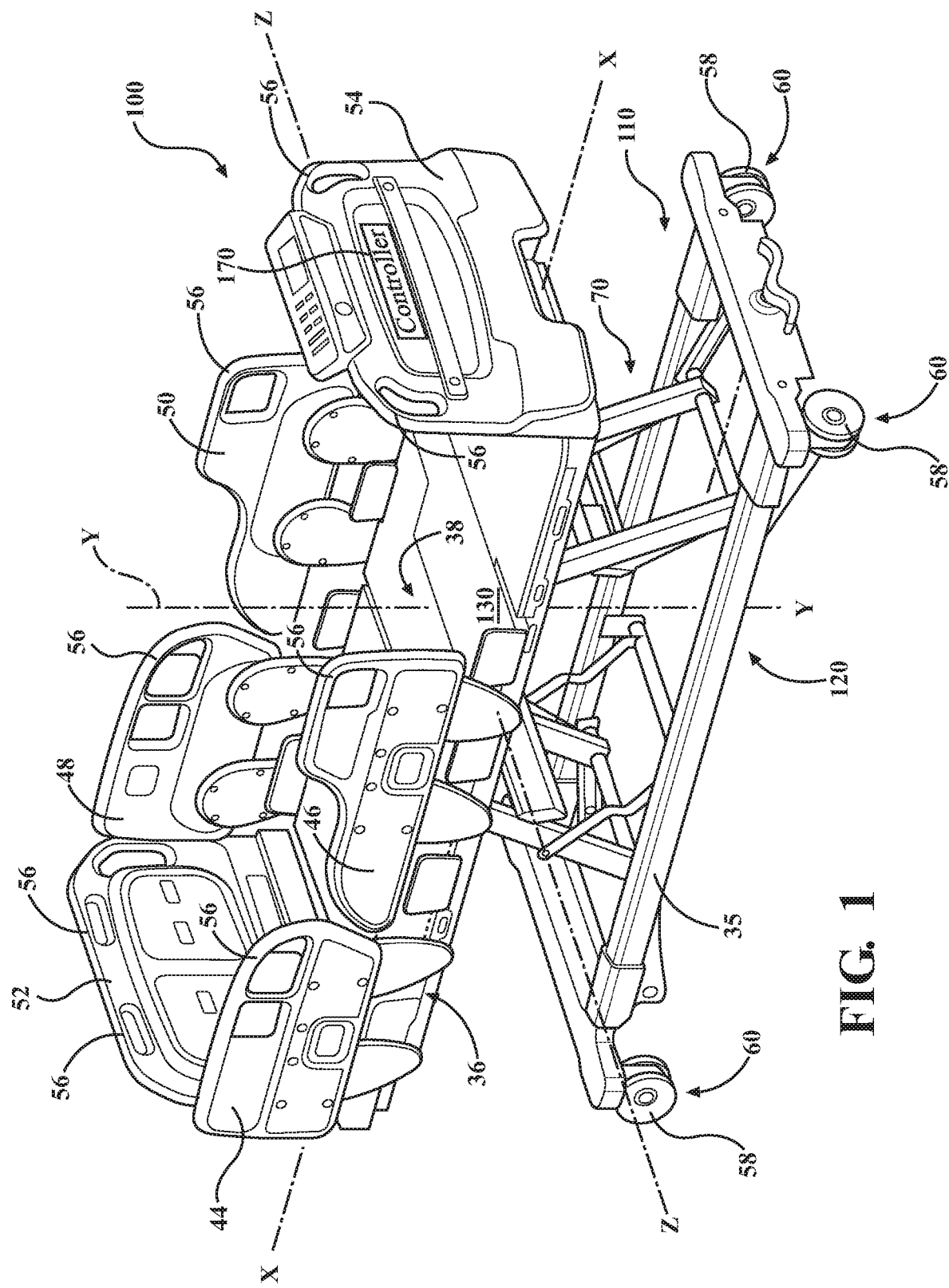
FIG. 1 is a perspective view of a patient support apparatus.

Referring to FIG. 1, a patient support apparatus 100 is shown for supporting a patient in a health care setting. The patient support apparatus 100 illustrated in FIG. 1 comprises a hospital bed. In other embodiments, however, the patient support apparatus 100 may comprise a stretcher, cot, table, wheelchair, or similar apparatus utilized in the care of a patient.

A support structure 110 provides support for the patient. The support structure 110 illustrated in FIG. 1 comprises a base 120 and a support frame 36. The base 120 comprises a base frame 35. The support frame 36 is spaced above the base frame 35 in FIG. 1. The support structure 110 also comprises a patient support deck 38 disposed on the support frame 36. The patient support deck 38 comprises several sections, some of which are capable of articulating relative to the support frame 36, such as a back section, a seat section, a thigh section, and a foot section. The patient support deck 38 provides a patient support surface 130 upon which the patient is supported.

A mattress (not shown) is disposed on the patient support deck 38 during use. The mattress comprises a secondary patient support surface upon which the patient is supported. The base 120, support frame 36, patient support deck 38, and patient support surfaces 130 each have a head end and a foot end corresponding to designated placement of the patient's head and feet on the patient support apparatus 100. The construction of the support structure 110 may take on any suitable design, and is not limited to that specifically set forth above. In addition, the mattress may be omitted in certain embodiments, such that the patient rests directly on the patient support surface 130.

Side rails 44, 46, 48, 50 are coupled to the support frame 36 and are thereby supported by the base 120. A first side rail 44 is positioned at a right head end of the support frame 36. A second side rail 46 is positioned at a right foot end of the support frame 36. A third side rail 48 is positioned at a left head end of the support frame 36. A fourth side rail 50 is positioned at a left foot end of the support frame 36. If the patient support apparatus 100 is a stretcher or a cot, there may be fewer side rails. The side rails 44, 46, 48, 50 are movable to a raised position in which they block ingress and egress into and out of the patient support apparatus 100, one or more intermediate positions, and a lowered position in which they are not an obstacle to such ingress and egress. In still other configurations, the patient support apparatus 100 may not include any side rails.

A headboard 52 and a footboard 54 are coupled to the support frame 36. In other embodiments, when the headboard 52 and footboard 54 are included, the headboard 52 and footboard 54 may be coupled to other locations on the patient support apparatus 100, such as the base 120. In still other embodiments, the patient support apparatus 100 does not include the headboard 52 and/or the footboard 54.

Caregiver interfaces 56, such as handles, are shown integrated into the footboard 54 and side rails 44, 46, 48, 50 to facilitate movement of the patient support apparatus 100 over floor surfaces. Additional caregiver interfaces 56 may be integrated into the headboard 52 and/or other components of the patient support apparatus 100. The caregiver interfaces 56 are graspable by the caregiver to manipulate the patient support apparatus 100 for movement.

Wheels 58 are coupled to the base 120 to facilitate transport over the floor surfaces. The wheels 58 are arranged in each of four quadrants of the base 120 adjacent to corners of the base 120. In the embodiment shown, the wheels 58 are caster wheels able to rotate and swivel relative to the support structure 110 during transport. Each of the wheels 58 forms part of a caster assembly 60. Each caster assembly 60 is mounted to the base 120. It should be understood that various configurations of the caster assemblies 60 are contemplated. In addition, in some embodiments, the wheels 58 are not caster wheels and may be non-steerable, steerable, non-powered, powered, or combinations thereof. Additional wheels are also contemplated. For example, the patient support apparatus 100 may comprise four non-powered, non-steerable wheels, along with one or more powered wheels. In some cases, the patient support apparatus 100 may not include any wheels.

In other embodiments, one or more auxiliary wheels (powered or non-powered), which are movable between stowed positions and deployed positions, may be coupled to the support structure 110. In some cases, when these auxiliary wheels are located between caster assemblies 60 and contact the floor surface in the deployed position, they cause two of the caster assemblies 60 to be lifted off the floor surface thereby shortening a wheel base of the patient support apparatus 100. A fifth wheel may also be arranged substantially in a center of the base 120.

An actuator 140, shown in FIG. 2, is coupled to the support structure 110 and is operable to move the patient support surface 130, and/or one or more components thereof. In the embodiment of the patient support apparatus 100 shown in FIG. 2, the patient support apparatus 100 includes two actuators 140. However, the patient support apparatus 100 and any of the techniques described herein may utilize any number of actuators 140 individually or in combination.

The actuator 140 may have any configuration suitable for moving the patient support surface 130. For example, the actuator 140 may be a mechanical, hydraulic, pneumatic, electric, thermal, or magnetic actuator. The actuator 140 may include a motor and may be a rotational actuator or a linear actuator. In a further example, the actuator 140 may be an inflatable actuator that inflates to move the patient support surface 130. The actuator 140 may create any suitable type of motion for the patient support surface 130, such as linear motion, rotational motion, angular motion, and the like.

Figure 3A:
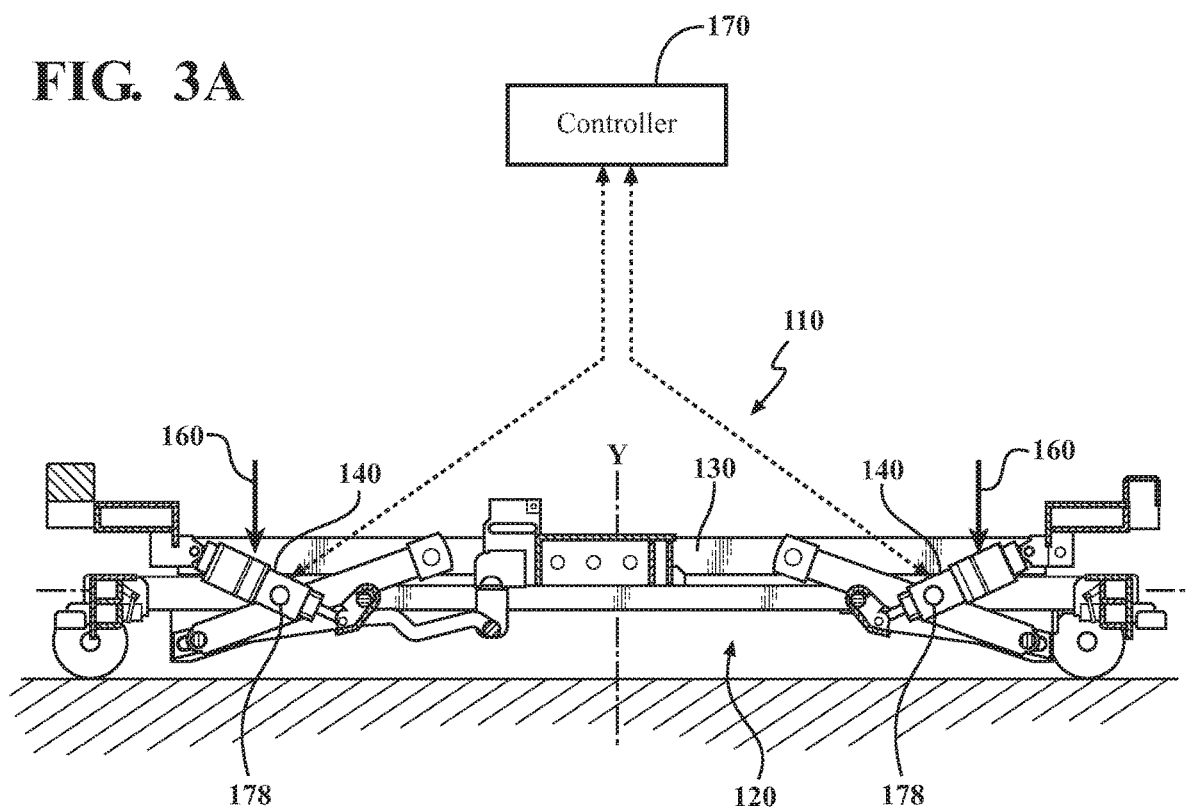
FIG. 3A is a side view of a base and support structure of the patient support apparatus wherein the support structure is at a lowered position relative to the base.
Figure 3B:
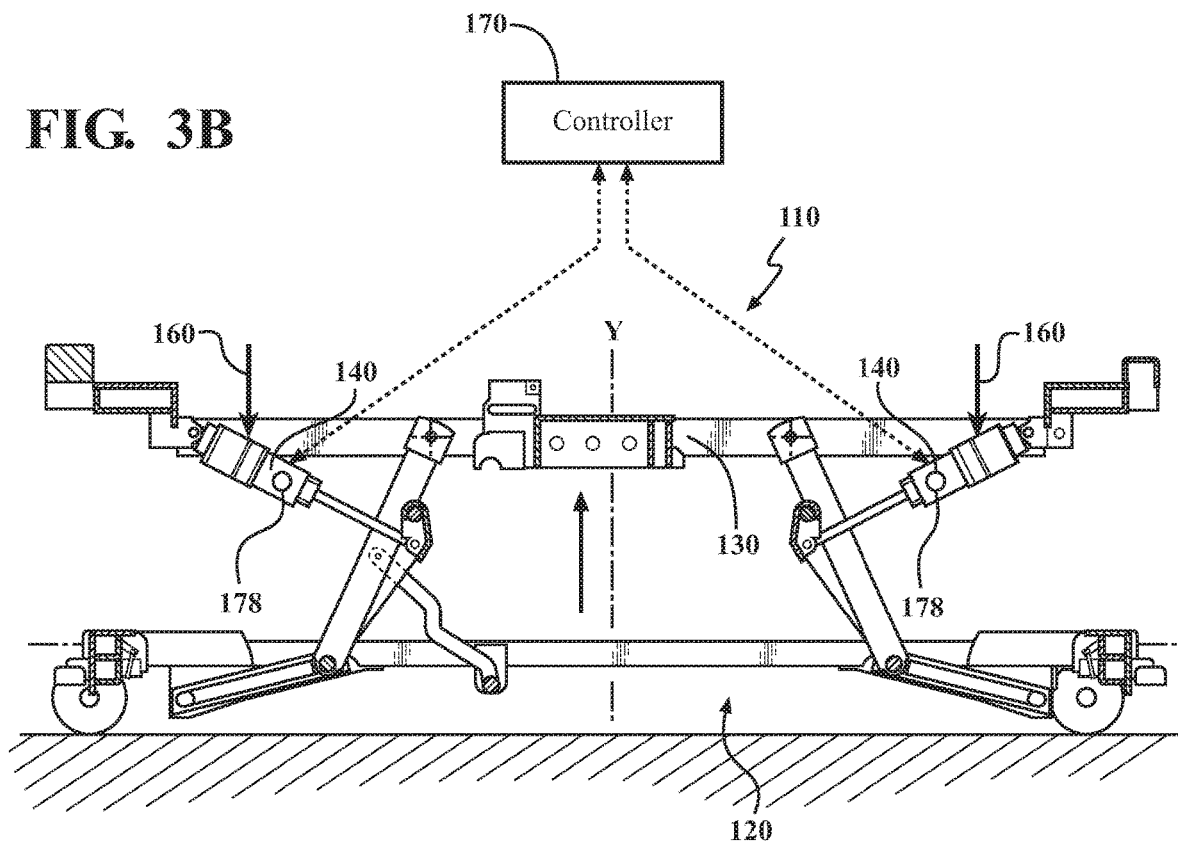
FIG. 3B is a side view of the base and the support structure of the patient support apparatus wherein the support structure is elevated from the base by the actuators.

Additionally, the actuator 140 may be configured to move the patient support surface 130 in a variety of directions. In FIGS. 3A and 3B, the actuator 140 moves the patient support surface 130 along a vertical Y-axis. However, the actuator 140 may move the patient support apparatus 100 along any combination of Y, X, and Z-axes, which are shown in FIG. 2.

The patient support apparatus 100, as shown in FIG. 2, also includes a controller 170 coupled to and controlling the actuator 140. For example, in FIGS. 3A and 3B, the controller 170 controls the actuator 140 to move the patient support surface 130 along the vertical Y-axis.

The actuator 140 may be configured to move the patient support surface 130 based on a state of the patient support apparatus 100. For example, as shown in FIG. 2, a load 160 is applied to the actuator 140. In FIG. 2, the load 160 is applied because of a placement of the patient on the patient support surface 130. The load 60 may relate, for example, to a weight of the patient 150. As shown in FIGS. 2, 2A, 3A, 3B, the patient support apparatus 100 may also include a sensor 178, which is coupled to the controller 170 and configured to produce readings indicative of the load 60. As follows, the actuator 140 may move the patient support surface 130 based on the load 160, an existence of the load 160, a current demanded by the load 160, and a voltage to be applied by the actuator 140 as a result of the load 160.

II. Operation of the Controller and Actuator

Figure 4:
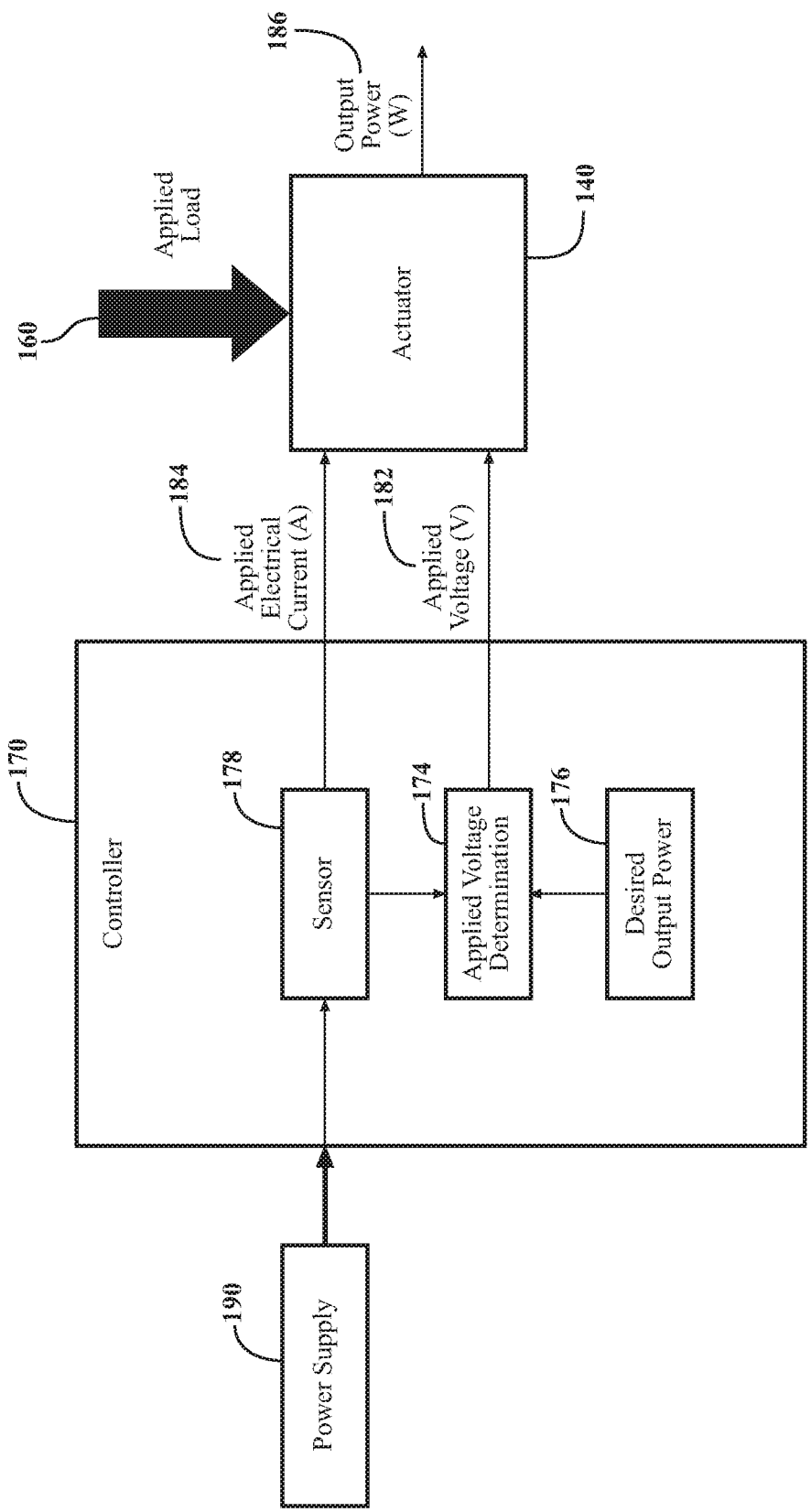
FIG. 4 is a block diagram of one example of a controller of the patient support apparatus for controlling the actuators based on the applied load.

As shown in FIG. 4, a power supply 190 provides the actuator 140 with electrical energy, which the actuator 140 uses to produce an output power 186 to move the patient support surface 130. The output power 186 is the actual power produced by the actuator 140 during movement of the patient support surface 130. The power supply 190 may provide electrical energy to the actuator 140 through an input of the controller 170 in the form of an applied electrical current 184 and an applied voltage 182. For instance, the applied electrical current 184 provided by the power supply 190 may be drawn in by the actuator 140 after the actuator 140 receives the load 160. In such an instance, the applied electrical current 184 may be a function of the load 160, such as a torque, applied to the actuator 140. Additionally, the applied voltage 182 may be provided to the actuator 140 via the controller 170, allowing the controller 170 to modify the applied voltage 182. In such an instance, the controller 170 may control a rate of motion, such as a rotational speed, of the actuator 140 by modifying the applied voltage 182. In this way, the controller 170 may control the actuator 140. The actual output power 186 may be monitored by the controller 170 periodically (e.g., every 1 millisecond) or continuously.

The controller 170 is configured to control the actuator 140 relative to a desired output power 176. The desired output power 176, represented by block 176 in the controller 170 of FIG. 4, is a desired amount of power to be used or consumed by the actuator 140 during operation, such as to move the patient support surface 130. For example, the controller 170 may control the actuator 140 such that a difference (e.g., error) between the (actual) output power 186 and the desired output power 176 is minimized. However, there may be other ways to control the actuator 140 relating to the actual and desired output power 186, 176. The desired output power 176 may be stored in a memory device integrated with or coupled to the controller 170. The desired output power 176 may be known to the system prior to starting production of the output power 186 or known and updated "on the fly" prior to subsequent production of output power 186. In some embodiments, the desired output power 176 relates to a predetermined maximum power value of the power supply 190 or other power parameters of the power supply 190 coupled to the actuator 140. The desired output power 176 may be a limit that should not be exceeded over a period of time. As such, the system and techniques for operating the patient support apparatus 100 allow for control of the actuator 140 using a maximum power available from the power supply 190 without overloading the power supply 190. The desired output power 176 may also relate to performance parameters of the actuator 140 itself.

Furthermore, the controller 170 is configured to control the actuator 140 in response to the load 160 being applied to the actuator 140. Referring back to the embodiment of the patient support apparatus 100 shown in FIGS. 3A and 3B, the controller 170 is shown receiving a reading of the load 160 from the sensor 178. In this embodiment, the load 160 corresponds to the force of gravity on the mass of the patient and is therefore applied in a direction along the Y-axis. Of course, the load 160 may be applied in a variety of other ways. After receiving a reading of the load 160, the controller 170 controls the actuator 140 to move the patient support surface 130 in response to the load 160. In some embodiments, the controller 170 may control a rate of motion (e.g., a rotational speed) of the actuator 140 in response to the load.

FIG. 4 illustrates an embodiment of the controller 170. The controller 170 of FIG. 4 may be configured to control the actuator 140 relative to the desired output power 176 and in response to the load 160. For example, the controller 170 may be configured to control the actuator 140 by determining the desired output power 176 of the actuator 140 and controlling the actuator 140 such that a difference between the (actual) output power 186 produced by the actuator 140 and the desired output power 176 is minimized. The output power 186, shown in FIG. 4, represents the amount of power the actuator 140 produces to move the patient support surface 130. For simplicity, the output power 186 is shown at an output side of the actuator 140. To minimize the difference between the output power 186 and the desired output power 176, the controller 170 controls the electrical energy provided to the actuator 140 from the power supply 190. In the embodiment of FIG. 4, the actuator 140 draws in the applied electrical current 184 in response to the load 160. In response, the controller 170 controls the electrical energy provided to the actuator 140 by modifying the applied voltage 182 based on the desired output power 176 and a reading of the applied electrical current 184. Therefore, once the actuator 140 draws in the applied electrical current 184 from the power supply 190 and receives the applied voltage 182 from the power supply 190 via the controller 170, the actuator 140 produces the corresponding output power 186 to move the patient support apparatus 100.

The controller 170 of FIG. 4 may modify the applied voltage 182 based on the desired output power 176 and the applied electrical current 184. Depending on the load 160 being applied to the actuator 140, the applied electrical current 184 drawn from the power supply 190 will vary. Accordingly, when the applied electrical current 184 varies, the applied voltage 182 may be modified to minimize a difference between the output power 186 and the desired output power 176. As shown in FIG. 4, the controller 170 senses the applied electrical current 184 drawn from the power supply 190 with the sensor 178. An applied voltage determination block 174 of the controller 170 then determines the applied voltage 182 based on the desired output power 176 and the applied electrical current 184 reading from the sensor 178. For example, the voltage determination block 174 may determine the applied voltage 182 by dividing the desired output power 176 by the applied electrical current 184 reading. As such, when variations in the load 160 affect the applied electrical current 184, the controller 170 modifies the applied voltage 182 to modify the output power 186 relative to the desired output power 176. Furthermore, the controller 170 is able to modify the applied voltage 182 prior to, after, or concurrent to the applied electrical current 184 being drawn by the actuator 140. In this way, the controller 170 controls the actuator 140 relative to the desired output power 176 by modifying the applied voltage 182 to compensate for the load 160 being applied to the actuator 140.

In some embodiments, the controller 170 modifies a rate of motion by which the actuator 140 moves the patient support surface 130 by modifying the applied voltage 182. For example, referring the FIG. 2, the actuator 140 is a rotational actuator, which includes a rotational motor 142, and the applied voltage 182 relates to a rotational speed 188 (referring to FIG. 2A) by which the rotational actuator 140 moves, producing motion (e.g., linear motion or otherwise) of the patient support surface 130. As such, the controller 170 may control the rotational speed 188 of the rotational actuator 140 by modifying the applied voltage 182. The power management techniques described herein may be utilized with any type of actuator 140 and any type of actuator 140 motion (e.g., rotational, linear, etc.)

The controller 170 of FIGS. 2 and 2A modifies the rotational speed 188 of the rotational actuator 140 relative to the desired output power 176 and in response to the load 160. In FIG. 2, the load 160 relates to a weight of the patient 150. In one scenario, a heavier patient 150 will cause the rotational actuator 140 to draw more electrical current from the power supply 190 when moving the patient support surface 130, increasing the applied electrical current 184 value. The controller 170 may then minimize a difference between the output power 186 and the desired output power 176 by preventing an increase in the output power 186 from the increased applied electrical current 184, the controller 170 decreases the applied voltage 182. As such, the controller 170 decreases the rotational speed 188 of the rotational actuator 140 to compensate for the heavier weight of the patient 150, and ultimately, causes the rotational actuator 140 to produce the output power 186 relative to the desired output power 176. In an alternative scenario, a lighter patient 150 will cause the rotational actuator 140 to draw relatively less electrical current from the power supply 190 when moving the patient support surface 130. The controller 170 may then minimize a difference between the output power 186 and the desired output power 176 by preventing a decrease in the output power 186 from the decreased applied electrical current 184, the controller 170 increases the applied voltage 182. As such, the controller 170 increases the rotational speed 188 of the rotational actuator 140 to compensate for the lighter weight of the patient 150, and ultimately, causes the rotational actuator 140 to produce the output power 186 relative to the desired output power 176. Through these techniques, the controller 170 is able to effect movement of the patient support apparatus 100 with the rotational actuator 140, or any suitable actuator 140, at the fastest possible rate of motion and without overloading the power supply 190.

There are various methods the controller 170 may use to manage the output power 186 relative to the desired output power 176, or vice-versa. For example, FIGS. 5-9 demonstrate a variety of methods where the difference between the output power 186 and the desired output power 176 is minimized, as well as a variety of other methods of controlling the actuator 140 relative to the desired output power 176.

Figure 5:
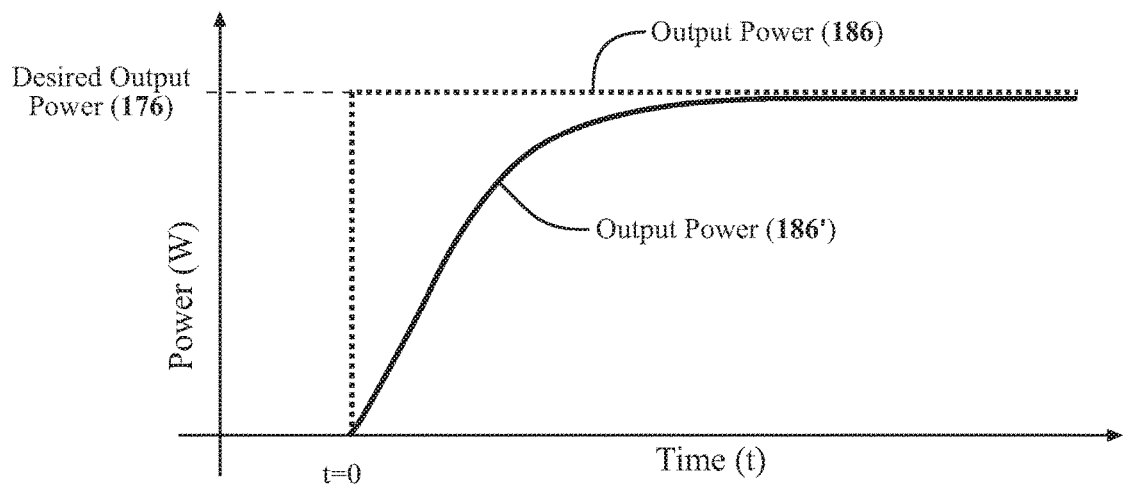
FIGS. 5, 6, and 7 are various examples of graphs showing output power of the actuator of the patient support apparatus controlled relative to desired output power.

In FIG. 5, a first example is shown where the controller 170 is configured to control the actuator 140 such that the output power 186 (dotted line) produced by the actuator 140 is adjusted to be equivalent to the desired output power 176. In this example, the output power 186 is near instantaneously adjusted to be the same as the desired output power 176 at t=0. Such adjustment may occur prior to the output power 186 being produced, after the output power 186 is produced, or concurrent to the output power 186 being produced.

In another example in FIG. 5, the controller 170 controls the actuator 140 such that the output power 186' is adjusted progressively towards the desired output power 176. Here, the controller 170 is able to monitor the output power 186 of the actuator 140 to reduce the error between the output power 186 and the desired output power 176. Closed loop control schemes, such as, but not limited to those described herein, may be utilized to accomplish this control. For example, in some instances, the output power 186' may overshoot the desired output power 176 before stabilizing at the desired output power 176.

Figure 6:
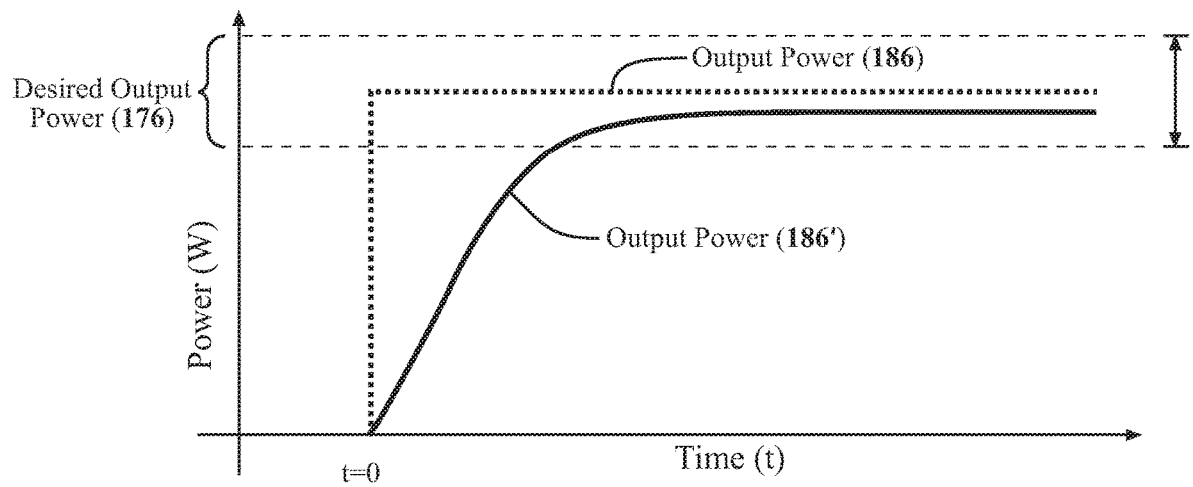

In FIG. 6, the desired output power 176 is a range. In embodiments of the patient support apparatus 100 that require a greater level of flexibility for operation of the actuator 140, providing the range for the desired output power 176 may be desirable. In such embodiments, the controller 170 may control the actuator 140 such that the output power 186 (dotted line) is equivalent to any value within the range or such that the output power 186' (solid line) progressively approaches the range.

Figure 7:
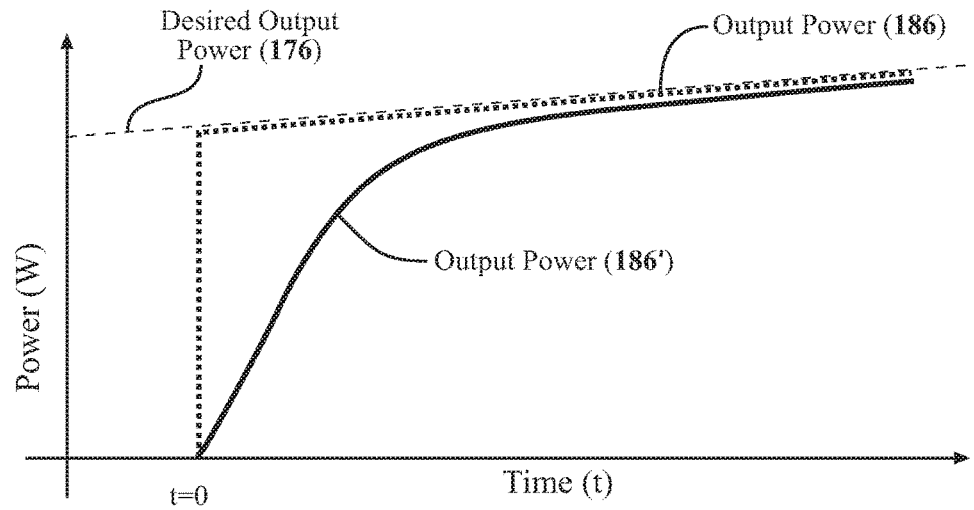

In FIG. 7, the desired output power 176 is variable. In embodiments of the patient support apparatus 100 that require a variable amount of power with respect to time, such a configuration of the controller 170 may be desirable. For instance, the desired output power 176 may be varied depending upon a monitored load on the power supply 190, a monitored power consumption by the patient support apparatus 100, a monitored number of actuators 140 being utilized, or the like. In such embodiments, the controller 170 may control the actuator 140 such that the output power 186 (dotted line) is equivalent to the variable desired output power 176 or such that the output power 186' (solid line) progressively approaches the variable desired output power 176.

The desired output power 176 may be varied according to any mathematical function. For example, the desired output power 176 may be controlled according to any order and type of function, such as a linear function, a quadratic function, an exponential function, a polynomial function, a sinusoidal function, a logarithmic function, or irregularly/intermittently based on factors that may dynamically cause modification to the desired output power 176.

Figure 8:
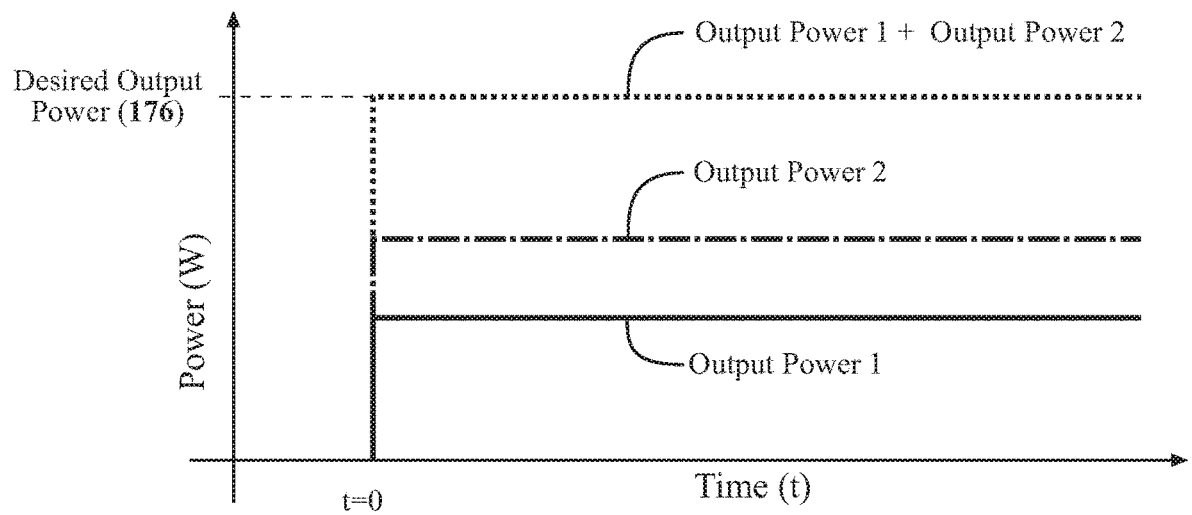
FIGS. 8 and 9 are examples of graphs showing output power of two actuators of the patient support apparatus controlled relative to common desired output power.

As described, the controller 170 may control more than one actuator 140, and may do so relative to the desired output power 176. For example, as shown in FIG. 8, the controller 170 controls the actuators 140 such that the output power 186 produced by each of the actuators 140 individually is controlled relative to the desired output power 176. In the example of FIG. 8, the controller 170 accomplishes this task by controlling the more than one actuators 140 relative to an Output Power 1 and an Output Power 2, where a sum of Output Power 1 and Output Power 2 is equivalent to the desired output power 176. In other words, the controller 170 controls each actuator 140 such that an output power 186 of a first actuator 140 is equivalent to Output Power 1 and an output power 186 of a second actuator 140 is equivalent to Output Power 2, where a sum of Output Power 1 and Output Power 2 is equivalent to the desired output power 176. Therefore, the controller 170 is able to control more than one actuator 140, while controlling the sum of the output powers 186 relative to the desired output power 176. Additionally, while the control technique shown in FIG. 8 illustrates that the controller 170 controls the first and second actuators 140 simultaneously at a time "t=0", in other instances of the control technique, the controller 170 may control the first and second actuators 140 at a different time. For example, in one embodiment, the controller 170 may control one actuator 140 after controlling another actuator 140.

Figure 9:
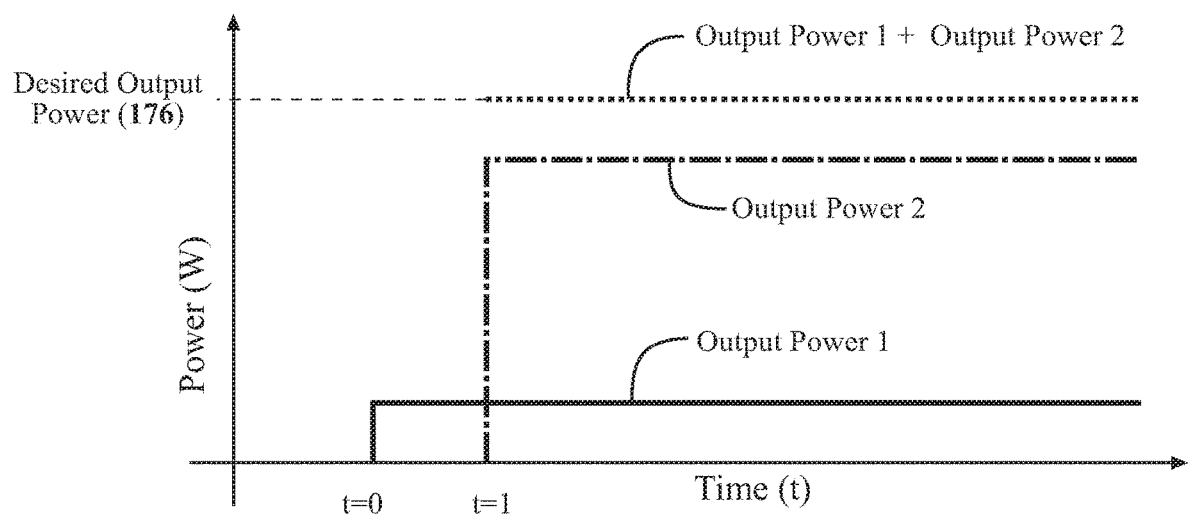

Alternatively, as shown in FIG. 9, the controller 170 employs a different technique for controlling more than one actuator 140, while maintaining the desired output power 176. As shown, after the first actuator 140 produces the output power 186 (Output Power 1) at time "t=0", the controller 170 controls the second actuator 140 at time "t=1" such that the output power 186 (Output Power 2) produced by the second actuator 140 is equivalent to the difference between the desired output power 176 and Output Power 1. In this way, the controller is also able to control more than one actuator 140, while controlling the sum of the output powers 186 relative to the desired output power 176.

In FIGS. 8 and 9, Output Power 1 and Output Power 2 are shown to be different values for simplicity in illustration. Output Power 1 and Output Power 2 may of course be the same values or different values depending on the function and position of the actuators 140 and the load applied to each respective actuator 140. Furthermore, the controller 170 may use any combination of the above-described methods (e.g., the methods shown in FIGS. 5-7) to control the actuators 140 as described in FIGS. 8 and 9. For example, while the desired output power 176 is a value in FIGS. 8 and 9, the desired output power 176 may also be a range and may be variable. In another example, while the controller 170 in FIGS. 8 and 9 controls each actuator 140 such that the sum of output powers 186 produced by each actuator 140 is maintained to be equivalent to the desired output power 176, the controller 170 may also control each actuator 140 such that the sum of output power 186 produced by each actuator 140 progressively approaches the desired output power 176.

Additionally, while FIGS. 8 and 9 demonstrate two different techniques for controlling two actuators 140 while controlling the sum of the output powers 186 of the two actuators 140, the controller 170 is able to control more than two actuators 140 using the techniques shown in FIGS. 8 and 9, or a combination of those techniques. For example, consider an embodiment where the patient support apparatus 100 comprises a total of "n" actuators 140, where "n" is greater than two. In such an embodiment, the controller 170 may use any permutation or combination of the above techniques to control the desired output power 176 for the sum of the "n" actuators 140, the desired output power 176 for any one actuator 140 of the "n" actuators, and the desired output power 176 for any finite number (from one to "n") of the "n" actuators. In other words, the controller 170 may control the desired output power 176 for any permutation or combination of the "n" actuators using the above-described techniques.

Furthermore, using the above-described techniques, the actuators 140 may also be controlled based on a position of said actuators 140, a priority of said actuators 140, and a usage count of said actuators 140. For example, in some embodiments, the controller 170 may control the actuators 140 positioned on a side of the patient support apparatus, or distribute electrical energy such that the actuators 140 positioned on the side of the patient support apparatus 100 receive more electrical energy. Similarly, the controller 170 may control the actuators 140 based on a priority of the actuators 140, a usage count of the actuators 140, or any other relevant characteristic of the actuators 140.

III. Sensor Configurations

Referring back to the examples shown in FIGS. 2, 2A, 3A, 3B, the patient support apparatus 100 includes the sensor 178. In FIGS. 2, 2A, 3A, 3B, the sensor 178 is located on the actuator 140 and senses the load 160 being applied to the actuator 140. As shown in FIGS. 3A and 3B, the sensor 178 is coupled to the controller 170. The controller 170 is configured to control the actuator 140 in response to analyzing readings from the sensor 178.

Figure 10:
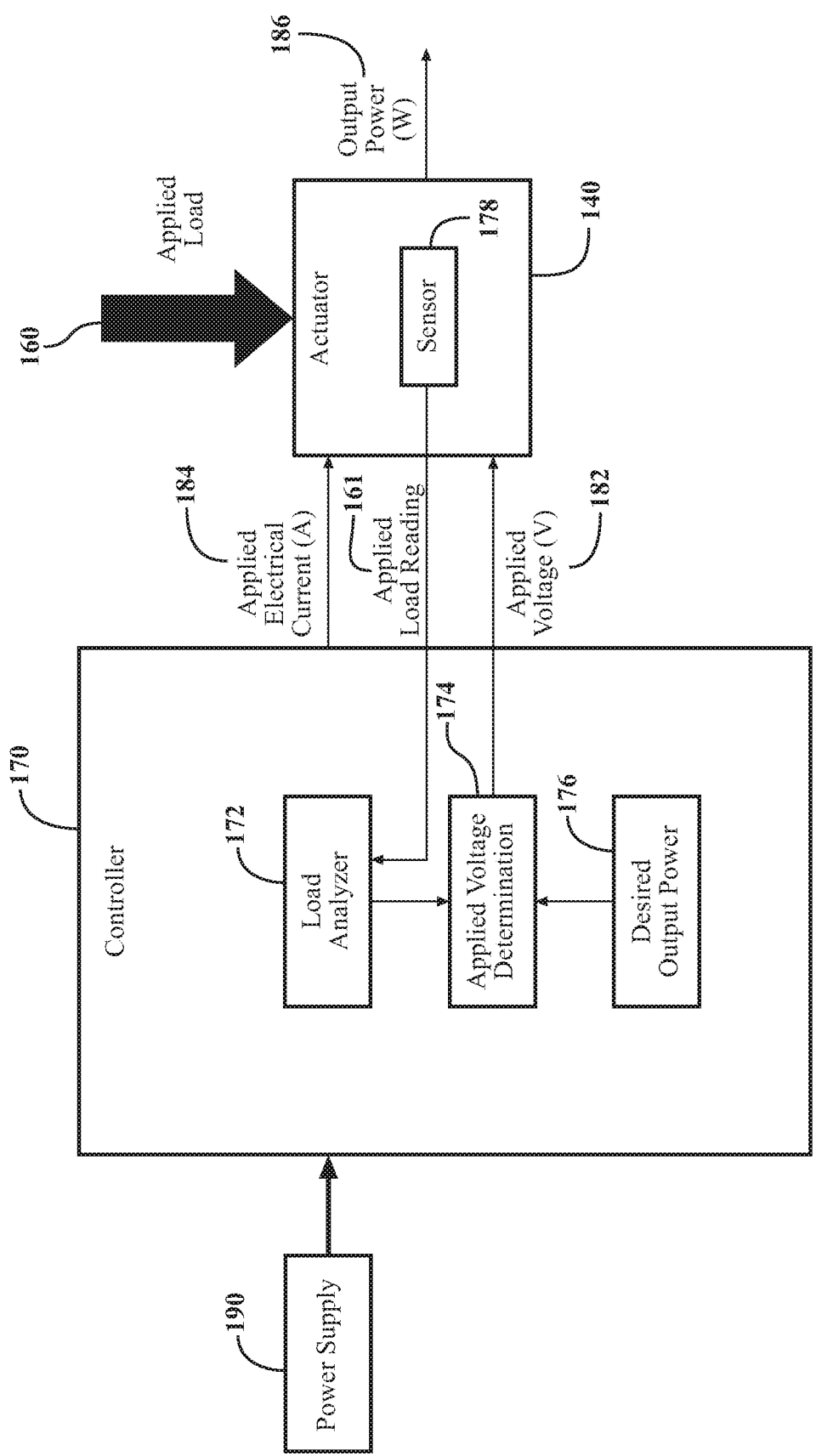
FIG. 10 is a block diagram showing further aspects of the controller for monitoring an applied electrical current.

The sensor 178 may be configured to sense the load 160 using a variety of methods. Accordingly, the controller 170 may be configured to analyze readings from the sensor 178 using a variety of methods. FIG. 4 and FIG. 10 demonstrate various embodiments of the sensor 178 and a variety of methods of analyzing readings from the sensor 178.

For example, referring to FIG. 4, the sensor 178 is coupled to the power supply 190 and is configured to sense the applied electrical current 184 drawn in by the actuator 140. In such an embodiment, the sensor 178 may be coupled to the power supply 190 while also being located on the actuator 140. After the sensor 178 of FIG. 4 senses the applied electrical current 184, the controller 170 receives readings of the applied electrical current 184 from the sensor 178 to determine the applied voltage 182.

Referring to FIG. 10, the sensor 178 senses the load 160 and sends a reading 161 indicative of the load 160 to a load analyzer block 172 in the controller 170, where the load 160 is analyzed and the applied electrical current 184 determined. The controller 170 then modifies the applied voltage 182 relative to the applied electrical current 184 and the desired output power 176 using the applied voltage determination block 174. Once this determination is complete, the controller 170 provides the applied electrical current 184 and the applied voltage 182 to the actuator 140. The controller 170 may modify and provide the applied voltage 182 prior to, after, or concurrent to providing the applied electrical current 184 to the actuator 140.

FIGS. 4 and 10 demonstrate two examples of the sensor 178, which may be embodied as different sensor types. In FIG. 4, the sensor 178 is configured to sense the amount of electrical current drawn by the actuator 140 because of the load 160 instead of directly sensing the load 160. In this example, the sensor 178 may be embodied as an electrical current sensor. In FIG. 10, the sensor 178 directly senses the load 160 and, in such scenarios, the sensor 178 may be embodied as a load cell, force transducer, torque sensor, or the like. Additionally, in some instances, both embodiments of the sensor 178, as shown in FIGS. 4 and 10, may be present in a single embodiment of the patient support apparatus 100.

The sensor 178 may also include any one or more of a motion sensor, a pressure sensor, a camera, a switch, an optical sensor, an infrared sensor, an electromagnetic sensor, an accelerometer, a potentiometer, and an ultrasonic sensor. As such, the sensor 178 may be configured to sense various types of readings derived from electrical, mechanical, or electromechanical physics for providing an indication of the load 160 to the controller 170.

For example, in FIGS. 2, 2A, 3A, and 3B, the sensor 178 may be configured to sense the load 160 by sensing the torque being applied to the actuator 140. The controller 170 then controls the actuator 140 in response to the torque sensed. In another embodiment where the sensor 178 includes a motion sensor, the sensor 178 may sense a motion of the patient 150 thereby providing some indication of the load 160. In another embodiment, where the sensor 178 includes an infrared sensor, the sensor 178 may sense a heartbeat of the patient 150 via an infrared signal, indicating a presence of the patient 150, and hence, presence of the load 160. Thus, the load 160 may be directly measured by the sensor 178 or presence of the load 160 may be inferred by measurements from the sensor 178. The sensor 178 functions, readings, and configurations may be other than those described herein for detecting the load 160 or presence of the load 160.

IV. Power Supply Configurations

As described, the actuator 140 is configured to receive electrical energy, and more specifically, the applied electrical current 184 and the applied electrical voltage 182 from the power supply 190. The power supply 190 may have various configurations. For example, in one embodiment, the power supply 190 may be a mains electricity of a hospital. In another embodiment, the power supply 190 may be a battery, such as a battery located on the patient support apparatus 100 itself. Furthermore, the power supply 190 may be a DC or AC power supply.

Figure 11:
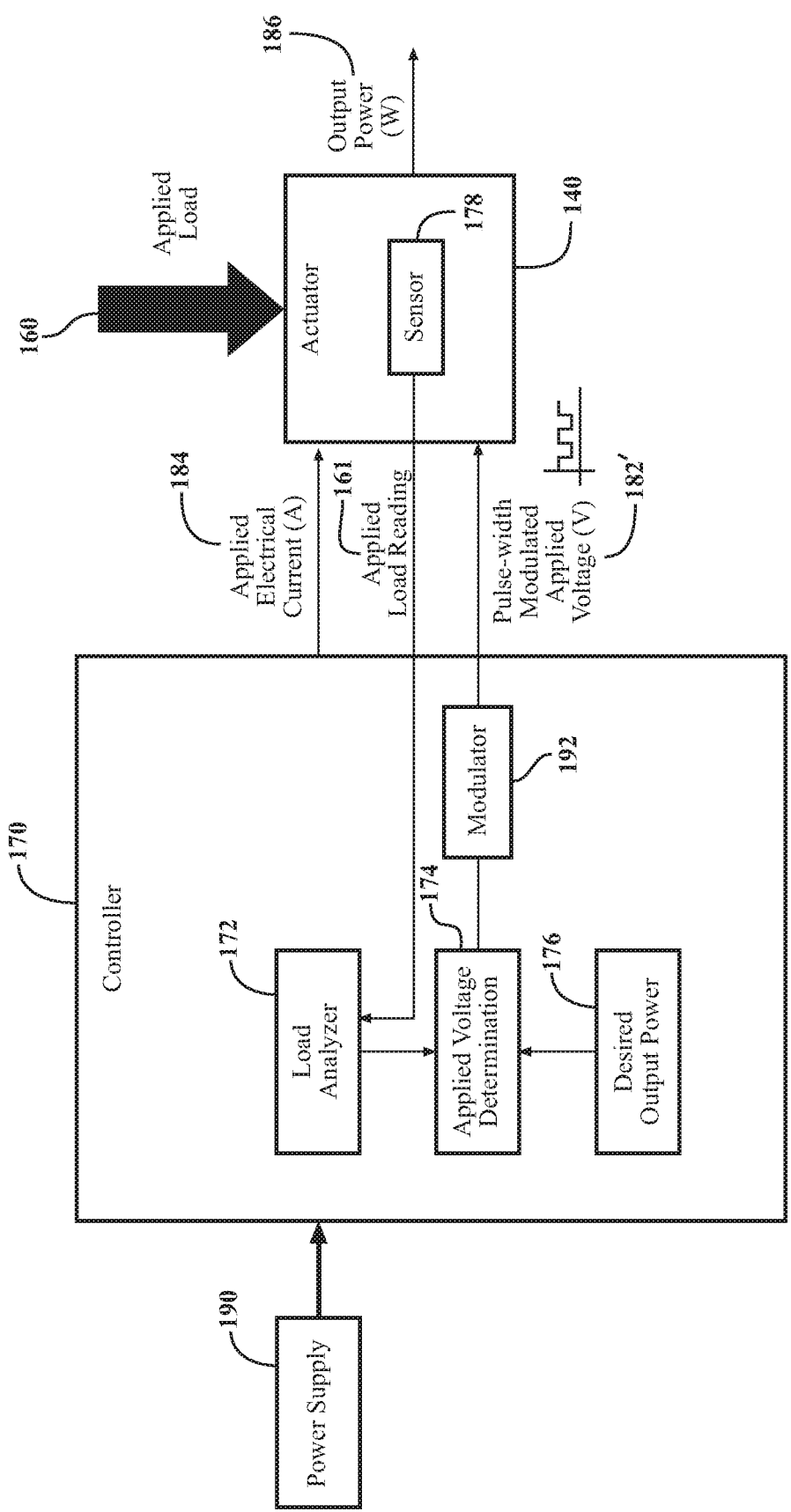
FIG. 11 is a block diagram showing further aspects of the controller for determining an applied voltage.

In the embodiment shown in FIG. 11, the controller 170 includes a modulator 192, which is configured to modulate the electrical energy provided by the power supply 190, either directly from the power supply 190 or transformed from the power supply 190, to produce a pulse-width modulated applied voltage 182' to control the actuator 140. However, the inclusion of the modulator 192 does not limit the power supply 190 to a type of power supply. The power supply 190 may be DC or AC based.

V. Overcurrent Protection

As previously stated, in some embodiments, the desired output power 176 may be specified in relation to power parameters related to the power supply 190 coupled to the actuator 140. For example, the desired output power 176 may be based on a power rating of the power supply 190.

In some embodiments, the patient support apparatus 100 may protect the power supply 190 from overcurrent situations. Usually, the power supply 190 is coupled to an overcurrent protection mechanism (such as a circuit breaker) that is configured to trip as an electrical current from the power supply 190 exceeds a predetermined threshold. However, the patient support apparatus 100 may also include its own overcurrent protection mechanism, which will trip in overcurrent situations to avoid tripping of the overcurrent protection mechanism of the power supply 190.

Figure 12:
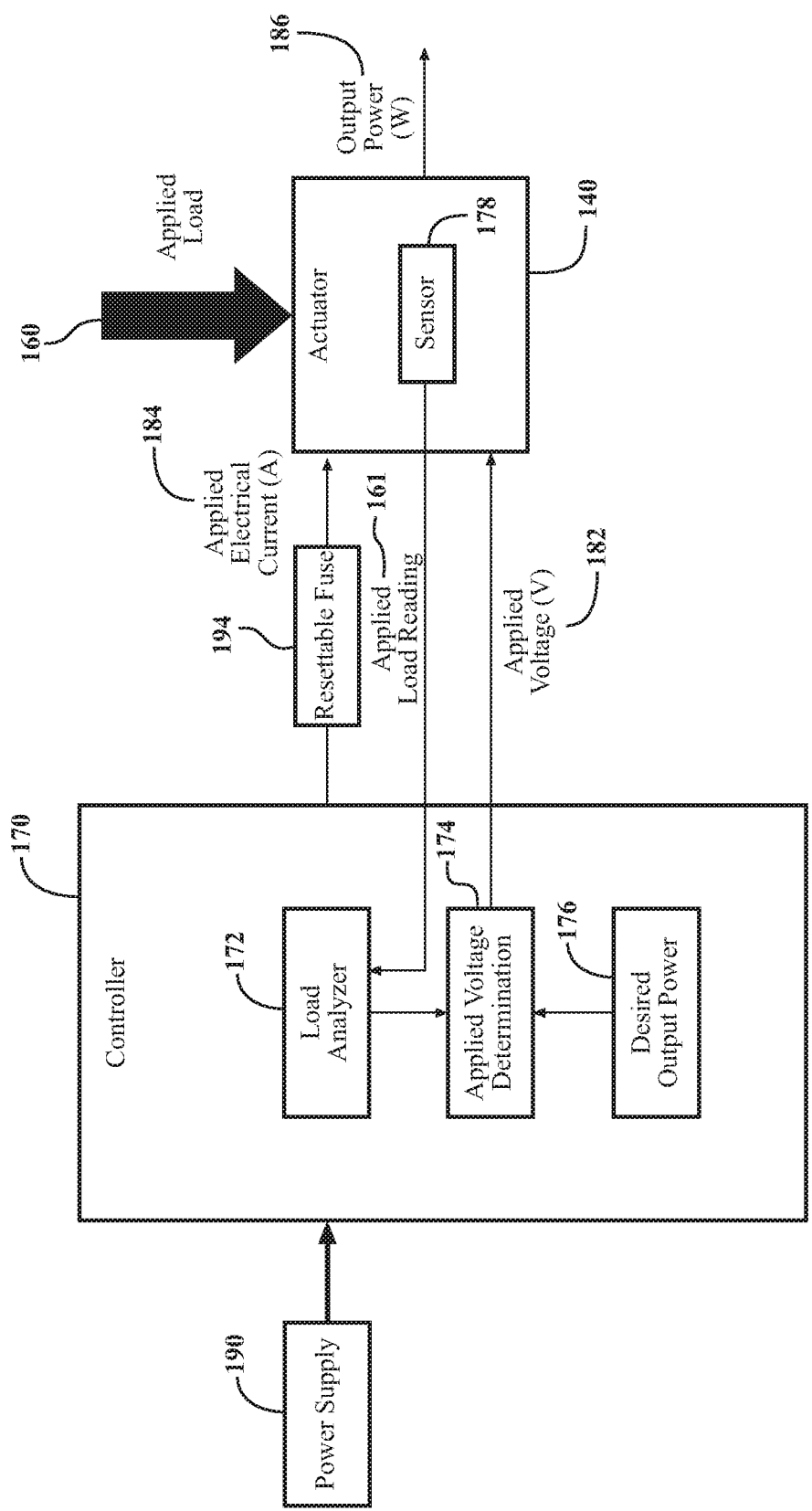
FIG. 12 is a block diagram of the controller interacting with a resettable fuse of the patient support apparatus.

One example of an overcurrent protection mechanism of the patient support apparatus 100 is shown in FIG. 12, where the patient support apparatus 100 further includes a resettable fuse 194 coupled to the actuator 140 to provide overcurrent protection. Here, the resettable fuse 194 is configured to trip as the applied electrical current 184 exceeds a predetermined threshold for electrical current, known as a trip current. In an embodiment where the actuator 140 is coupled to the power supply 190 with an overcurrent protection mechanism, the resettable fuse 194 may be sized or configured such that the trip current of the resettable fuse 194 is equal to or less than the predetermined threshold of the overcurrent protection mechanism of the power supply 190. As such, the resettable fuse 194 may be configured to trip, avoiding tripping of the overcurrent protection mechanism of the power supply 190.

In other embodiments, the resettable fuse 194 may be configured to protect the power supply 190 by holding the applied electrical current 184 at an electrical current hold value, known as a hold current. In such embodiments, the resettable fuse 194 would not instantly trip, but instead would hold the applied electrical current 184 at the hold current or allow the applied electrical current 184 to step over the hold current for a certain amount of time. Of course, the resettable fuse 194 may be sized such that the hold current of the resettable fuse 194 is less than the predetermined threshold of the overcurrent protection mechanism of the power supply 190. Such an embodiments not only avoids tripping of the resettable fuse 194, but also avoids tripping of the overcurrent protection mechanism of the power supply 190. The resettable fuse 194 may be an active or passive device. The resettable fuse 194 may be a polymeric temperature coefficient (PTC) device, a polymeric positive temperature coefficient (PPTC) device, a polyfuse, a polyswitch or the like. The resettable fuse 194 may be disposed at any suitable location relative to the actuator 140 other than the location shown in FIG. 12.

Furthermore, the trip current and the hold current of the resettable fuse 194 may be adjustable. As such, for power-intensive embodiments of the patient support apparatus 100, the trip current and the hold current may be increased, allowing the actuator 140 to receive more electrical energy from the power supply 190. For example, in one such embodiment, the controller 170 may control the actuators 140 to move the patient support surface 130 and the patient 150, into a CPR mode, which is a position conducive for performing CPR. It is advantageous, in such embodiments, for the controller 170 to control the actuators 140 as quickly as possible, allowing the patient 150 to be promptly transitioned to the CPR mode. Therefore, by increasing the trip current and the hold current, the actuators 140 are able to receive more electrical energy, allowing the actuators 140 to more quickly move the patient support surface 130 into the CPR mode. Alternatively, for embodiments of the patient support apparatus 100 where the actuator 140 is sensitive to higher levels of electrical energy, the trip current and hold current may be decreased accordingly.

Figure 13:
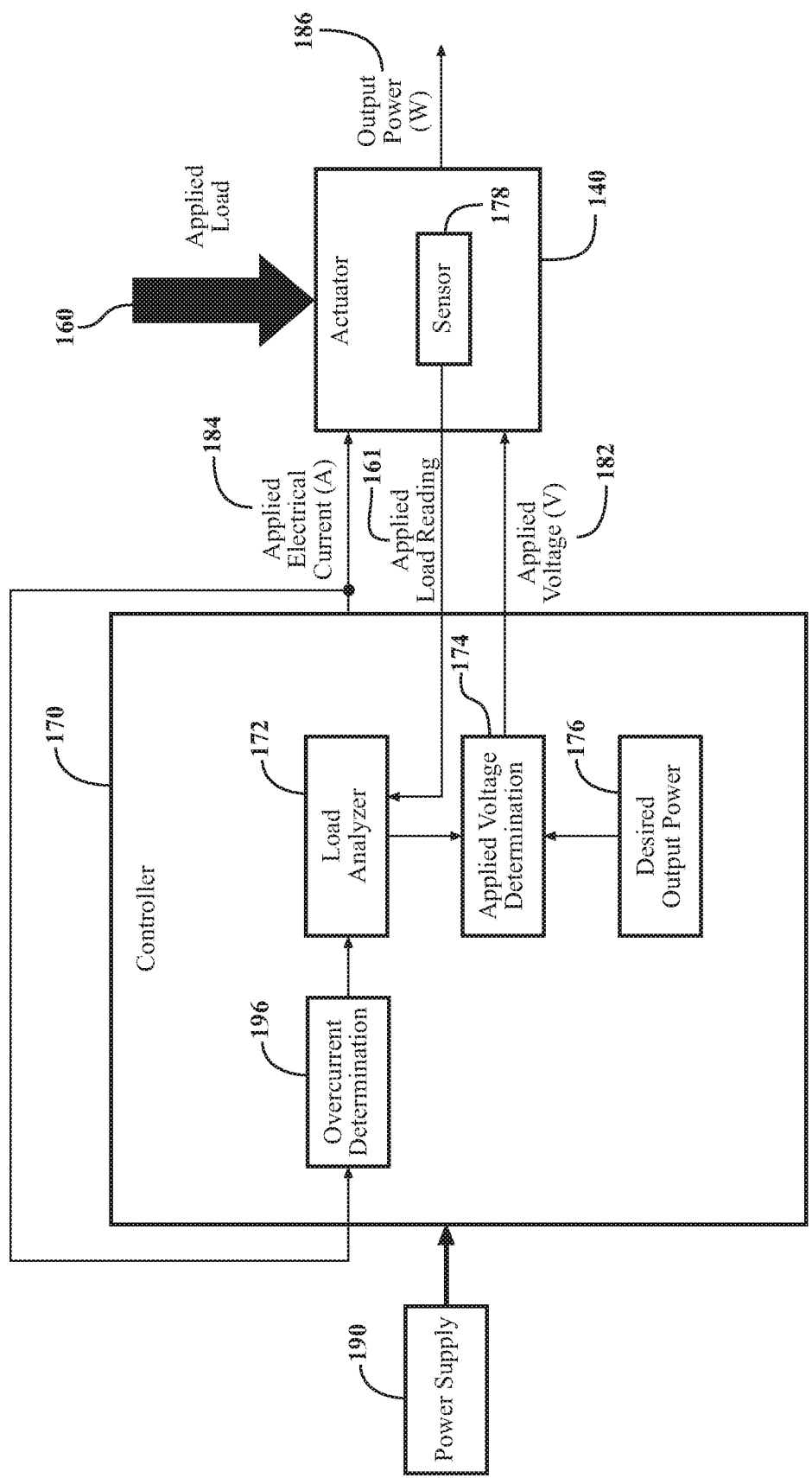
FIG. 13 is a block diagram of the controller implementing a feedback loop based on the applied electrical current to the actuator for controlling the applied voltage to the actuator.

Another example of an overcurrent protection mechanism of the patient support apparatus 100 is shown in FIG. 13, where the controller 170 is coupled to the actuator 140 to implement a feedback loop to limit the applied electrical current 182. As shown in FIG. 13, the applied electrical current 184 is monitored and a feedback loop sends the applied electrical current 184 to an overcurrent determination block 196, where the controller 170 determines whether an overcurrent situation has occurred. Once an overcurrent situation is detected, the controller 170 may use a variety of methods to limit the applied electrical current 182. For example, during an overcurrent situation, the controller 170 may override the applied electrical current 184 by providing the actuator 140 a maximum allowable electrical current instead of the applied electrical current 184. In another embodiment, the controller 170 may simulate a tripping of a circuit by preventing the power supply 190 from providing the applied electrical current 184. In various embodiments, the overcurrent determination block 196 may be a hardware-based system or a software-controlled system for sensing overcurrent. In one embodiment of the hardware-based system, the overcurrent determination block 196 may include a current sensor, such as a current sense FET, or the resettable fuse 194. Furthermore, while the overcurrent determination block 196 is coupled to the applied voltage determination block 174 via the load analyzer block 172 in FIG. 13, the overcurrent determination block 196 may be directly coupled to the applied voltage determination block 174 in other embodiments.

Several embodiments have been discussed in the foregoing description. However, the embodiments discussed herein are not intended to be exhaustive or limit the disclosure to any particular form. The terminology which has been used is intended to be in the nature of words of description rather than of limitation. Many modifications and variations are possible in light of the above teachings and the disclosure may be practiced otherwise than as specifically described.

The invention claimed is:

1. A patient support apparatus comprising:
a support structure comprising a base and a patient support surface configured to support a patient;
an actuator coupled to said support structure and operable to move said patient support surface, said actuator configured to receive an applied voltage and an applied electrical current and to produce an output power, wherein the applied electrical current varies based on different loads applied to said actuator;
a controller coupled to said actuator and configured to determine a desired output power of said actuator and to control said actuator such that the output power produced by said actuator is controlled relative to the desired output power by modifying the applied voltage to compensate for the different loads being applied to said actuator;
a resettable fuse coupled to said actuator and being configured to provide overcurrent protection, said resettable fuse being configured to trip as the applied electrical current exceeds a first predetermined threshold; and
a power supply coupled to said actuator and to an overcurrent protection mechanism, said overcurrent protection mechanism being configured to trip as an electrical current from said power supply exceeds a second predetermined threshold, wherein the first predetermined threshold of said resettable fuse is set equal to or less than the second predetermined threshold such that said resettable fuse is configured to trip to avoid tripping of the overcurrent protection mechanism.

2. The patient support apparatus of claim 1, wherein said controller is further configured to control said actuator such that the output power produced by said actuator is adjusted towards the desired output power.

3. The patient support apparatus of claim 1, wherein said controller is further configured to control said actuator such that the output power produced by said actuator is adjusted to be equivalent to the desired output power.

4. The patient support apparatus of claim 1, wherein said desired output power is further defined as a range, and wherein said controller is further configured to control said actuator such that the output power produced by said actuator is adjusted to be within the range.

5. The patient support apparatus of claim 1, wherein the desired output power is variable.

6. The patient support apparatus of claim 1, further comprising a sensor coupled to said controller and wherein said controller is further configured to control said actuator in response to analyzing readings from said sensor.

7. The patient support apparatus of claim 6, wherein said sensor comprises any one or more of a force sensor, a load cell, a motion sensor, a pressure sensor, a camera, a switch, an optical sensor, an infrared sensor, an electromagnetic sensor, an accelerometer, a potentiometer, an electrical current sensor, and an ultrasonic sensor.

8. The patient support apparatus of claim 1, wherein said actuator comprises a motor operable according to a speed, and further comprising a sensor configured to sense a load applied to said actuator and wherein said controller is further configured to control the speed of said motor relative to the desired output power and in response to the load applied to said actuator.

9. The patient support apparatus of claim 1, wherein said actuator comprises a motor being operable according to a speed, wherein said controller is further configured to control the speed of said motor relative to the desired output power by modifying the applied voltage.

10. The patient support apparatus of claim 1, wherein said actuator is configured to receive the applied voltage and the applied electrical current from a power supply.

11. The patient support apparatus of claim 10, wherein said controller is further configured to modulate the applied voltage provided by said power supply to produce a pulse-width modulation signal to control said actuator.

12. The patient support apparatus of claim 1, comprising a second actuator and wherein said controller is further configured to control said actuators such that the output power produced by said actuators in combination is controlled relative to the desired output power.

13. The patient support apparatus of claim 1, comprising a second actuator and wherein said controller is further configured to control said actuators such that the output power produced by each of said actuators individually is controlled relative to the desired output power.

14. The patient support apparatus of claim 1, comprising a second actuator and wherein said controller is further configured to control said actuators based on one or more of a position of said actuators, a priority of said actuators, and a usage count of said actuators.

15. The patient support apparatus of claim 1, wherein the desired output power is based on a power provided by a power supply coupled to said actuator.

16. The patient support apparatus of claim 1, wherein said resettable fuse is further configured to hold the applied electrical current at a hold value.

17. The patient support apparatus of claim 1, wherein the controller is coupled to said actuator to implement a feedback loop for limiting the applied electrical current.

18. A method of operating a patient support apparatus, the patient support apparatus comprising a support structure comprising a base and a patient support surface for supporting a patient, an actuator coupled to the support structure for moving the patient support surface, a controller coupled to the actuator, a resettable fuse coupled to the actuator, a power supply coupled to the actuator, and a overcurrent protection mechanism coupled to the power supply, the method comprising:
　receiving, with the actuator, an applied voltage and an applied electrical current, wherein the applied electrical current varies based on different loads applied to the actuator;
　producing, with the actuator, an output power associated with the applied voltage and the applied electrical current;
　determining, with the controller, a desired output power of the actuator;
　adjusting, with the controller, the applied voltage to the actuator such that the output power produced by the actuator is controlled relative to the desired output power given the load applied to the actuator; and
　applying electrical current from the power supply to the actuator through the overcurrent protection mechanism and through the resettable fuse, the resettable fuse being configured to trip as applied electrical current exceeds a first predetermined threshold, and the overcurrent protection mechanism being configured to trip as electrical current from the power supply exceeds a second predetermined threshold, with the first predetermined threshold being equal to or less than the second predetermined threshold such that the resettable fuse is configured to trip to avoid tripping of the overcurrent protection mechanism.

* * * * *